No. 813,795. PATENTED FEB. 27, 1906.
J. R. HILL.
TRANSFER PRESS.
APPLICATION FILED JAN. 25, 1905.
9 SHEETS—SHEET 2.

Witnesses
H. A. Robinette
G. Ayers

Inventor
John R. Hill.
By Louis A. Hill
Attorney

No. 813,795. PATENTED FEB. 27, 1906.
J. R. HILL.
TRANSFER PRESS.
APPLICATION FILED JAN. 25, 1905.

Witnesses
H. A. Robinette
G. Ayres

Inventor
John R. Hill.
By Louis A. Hill
Attorney

No. 813,795. PATENTED FEB. 27, 1906.
J. R. HILL.
TRANSFER PRESS.
APPLICATION FILED JAN. 25, 1905.

Witnesses
H. A. Robinette
G. Ayers

Inventor
John R. Hill.
By Louis N. Hill
Attorney

No. 813,795. PATENTED FEB. 27, 1906.
J. R. HILL.
TRANSFER PRESS.
APPLICATION FILED JAN. 25, 1905.

Witnesses
H. A. Robinette
G. Ayres

Inventor
John R. Hill.
By Louis A. Hill
Attorney

No. 813,795. PATENTED FEB. 27, 1906.
J. R. HILL.
TRANSFER PRESS.
APPLICATION FILED JAN. 25, 1905.

Witnesses
H. A. Robinette
G. Ayra

Inventor
John R. Hill

By Louis A. Hill
Attorney

No. 813,795. PATENTED FEB. 27, 1906.
J. R. HILL.
TRANSFER PRESS.
APPLICATION FILED JAN. 25, 1905.

Witnesses
H. O. Robinette
G. Ayres

Inventor
John R. Hill
By Louis A. Hill
Attorney

UNITED STATES PATENT OFFICE.

JOHN R. HILL, OF WASHINGTON, DISTRICT OF COLUMBIA.

TRANSFER-PRESS.

No. 813,795.     Specification of Letters Patent.     Patented Feb. 27, 1906.

Application filed January 25, 1905. Serial No. 242,678.

*To all whom it may concern:*

Be it known that I, JOHN R. HILL, a citizen of the United States, residing at Washington, in the District of Columbia, have invented certain new and useful Improvements in Transfer-Presses, of which the following is a specification.

My invention relates to improvements in transfer-presses; and it consists in the constructions, combinations, and arrangements herein described and claimed.

The objects of my invention are to provide an improved means for producing printing-plates by the transfer process which will obviate the necessity of engraving an initial plate for each different arrangement of characters or designs and then preparing a special transfer-roll therefrom.

A further object of my invention is to provide a simple means capable of attachment to the existing types of transfer-presses whereby all combinations and arrangement of characters can be accurately transferred to printing-plates by the employment of a limited number of stock transfer-rolls, thus overcoming the necessity of manufacturing and maintaining in stock a special transfer-roll for each different group or arrangement of characters.

A further object of my invention is to provide an improved means for accurately providing any predetermined or desired arrangement and spacing of the several characters or designs transferred to a printing-plate by a transfer-roll.

Referring to the accompanying drawings, forming a part of this application, and in which similar reference-symbols indicate corresponding parts in the several views.

In the accompanying drawings I have shown my invention applied to a preferred form of transfer-press fully described in my Patent No. 778,313 and in Patent No. 778,826 granted to myself and J. A. Svensson.

Referring to the drawings, 1 indicates a transfer-press frame provided with stanchions 2, in which a beam 3 is adjustably trunnioned. The beam is provided with adjustable bearers 4, on which is slidably mounted a saddle 5, which carries guideways 6 for the transfer-roll supports 7 and 8. A downwardly-extending portion 9 of the beam is engaged by a cam 10, secured on a shaft 11. An operating-lever 12 is secured to the shaft 11 for swinging the beam 3 on its trunnions to bring the roll into operative relation with its printing-plate. These parts are fully described in the above-referred-to patents.

Referring especially to Figs. 1, 27, 28, 29, and 30, 13 indicates a transfer-press bed slidably mounted on ball-bearings 90 and carrying a rack 91, arranged in mesh with a pinion 92, secured to the shaft 93. The press-bed carries a universal work-chuck, comprising two coöperating wedge members 14 and 15, a tiltable member 16, provided with a cylindrical portion 17, formed with a depression 18 in its upper surface, a member 19, rotatably mounted upon the cylindrical portion 17, a laterably-adjustable U-shaped member 20, slidably mounted on the rotatable member 19, and a longitudinally-adjustable member 21, carried by the member 20 and provided with clamps 22 for securely clamping the printing-plate thereto. The actuating-wedge 14 is provided on its lower face with grooves for engaging guide-rails 94 on the press-bed and with grooves on its upper surface for receiving guiding projections 95 on the wedge 15. An actuating-spindle 96 is swiveled in a projection 97 in the press-bed and provided with a threaded portion 98, engaging a nut 99, carried by the wedge 14 for actuating or shifting the latter along the rails 94 upon actuation of said spindle. The upper wedge 15 is confined from longitudinal movement by its depending lugs 100 and 101, which engage, respectively, the projection 97 and a rear projection 102, carried by the press-bed. As clearly shown in Fig. 28, the lug 100 is forked to straddle the spindle 96. This construction provides a simple and convenient means for raising or lowering the wedge 15. The lower surface of the tiltable member 16 is provided with a convex projection, which is supported in a similar depression in the wedge 15. A lug 103 on the tiltable member projects through a slot 104 in the wedge 15 and has its opposite sides engaged by adjusting-screws 105, which latter are threaded in the sides of the wedge 15 and provide means for tilting the member 16. The tiltable member is provided with an upwardly-extending cylindrical portion 17, which is formed with a stepped upper surface. The rotatable member 19 is rotatably supported on the cylindrical portion 17 and provided with a toothed wheel 106. A threaded spindle 107 is swiveled in a block 108, which is pivotally secured at 109 to the tiltable member. A nut 110, threaded on said spindle, is provided with a tooth 111, adapted to engage the toothed wheel 106, and a spring 112 is secured to the tilted member in position to engage said nut for normally maintaining it in engagement with the toothed wheel. The spindle 107 is provided at its outer end with a knurled head 113, which can be actuated by the operator to swing said spindle about its pivotal point 109 sufficiently to remove the tooth 111 from engagement with the wheel 106. This provides a ready means for roughly adjusting the rotatable member quickly through any desired angle by first disengaging the tooth 111 from the wheel 106 and then completing the final close adjustment by actuating the threaded spindle 107 with the tooth 111 in engagement with the wheel. A laterally-adjustable U-shaped member 20 is slidably mounted on the rotatable member 19, the parts being preferably so constructed that the upper surface of said member 20 lies in a common plane with the upper surface of the rotatable member 19 and of the cylindrical portion 17. The longitudinally-adjustable member 21 constitutes a work-holder slidably mounted in the adjustable member 20 and is provided with a guide-shoulder 114 for positioning the work and with a surface 115, which is arranged flush with and constitutes a practical continuation of the upper surface of the member 20. The member 21 is provided with clamps 22, adapted to clamp the work securely against the face 115, and with a rack 116, meshing with the pinion 117 for longitudinally adjusting the member 21 thereon. A screw 23 is swiveled at 24 in the laterally-adjustable member 20 and carries a vernier-wheel 25 in coöperative relation to an index-mark 26 on said member. Two threaded segments 27, pivotally supported at 28 on the rotatable member 19, are provided with slots 29, in which work crank-pins 30, carried by a common disk 31, which latter is rotatively supported on the member 19 and provided with an actuating-handle 32.

Figures 15, 16, 17:
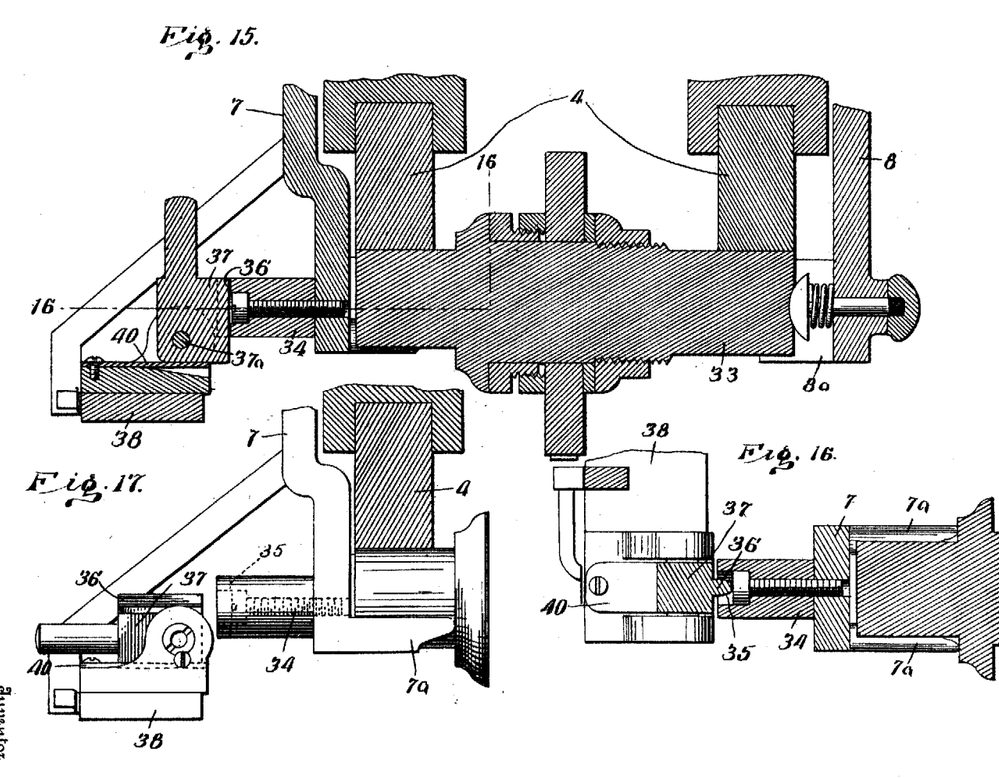
Fig. 15 is a sectional view on the line 15 15 of Fig. 13 with a latch carried by the roll-shifting arm adjusted to engage the roll-supports.
Fig. 16 is a sectional view on the line 16 16 of Fig. 15.
Fig. 17 is a detail sectional elevation on the line 17 17 of Fig. 13, showing the latch carried by the roll-shifting arm adjusted out of engagement with the roll-supports.
Figure 20:
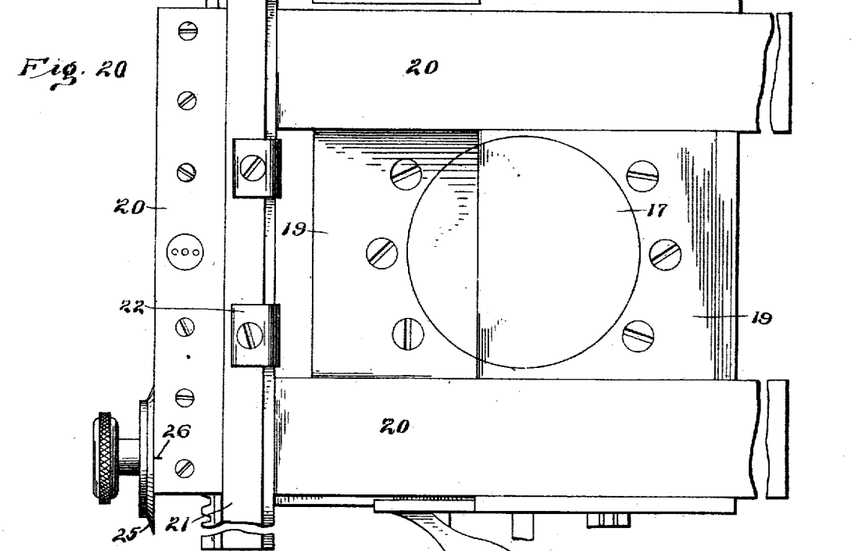
Fig. 20 is a detail plan view, on a larger scale, illustrating one form of work-chuck for holding the printing-plate.
Figure 21:
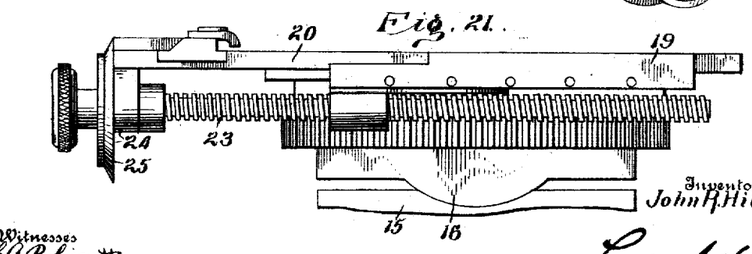
Fig. 21 is a detail front elevation of the parts shown in Fig. 20.
Figure 22:
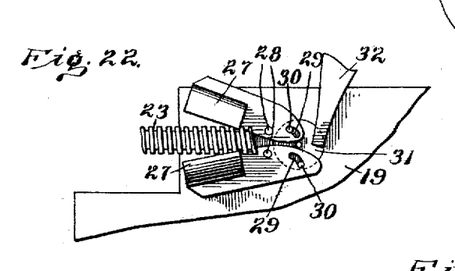
Fig. 22 is a detail bottom plan view of a split disengaging nut employed on the work-chuck.
Figure 23:
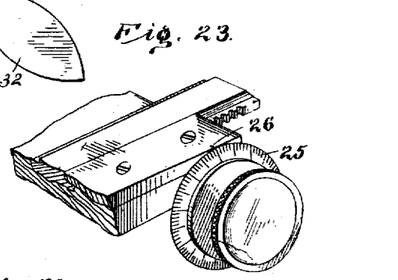
Fig. 23 is a detail perspective view of the vernier-wheel and index-mark employed on the work-chuck.
Figure 27:
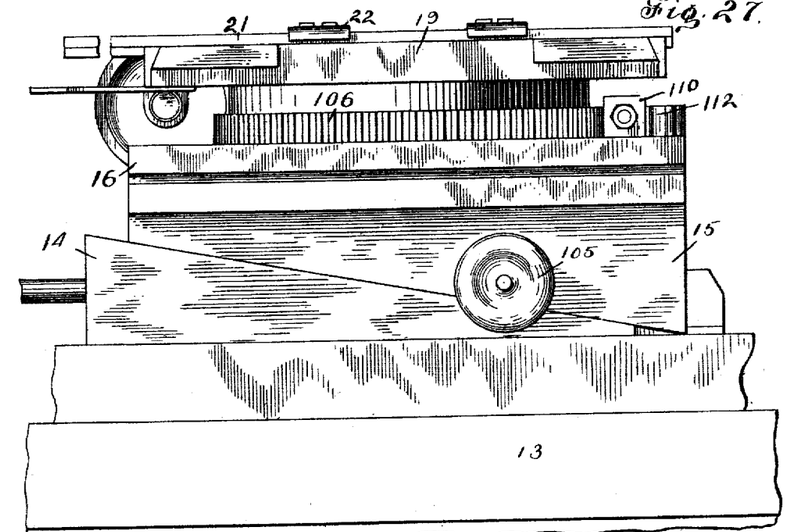
Fig. 27 is a side elevation showing my preferred form of universally-adjustable work-chuck.
Figure 28:
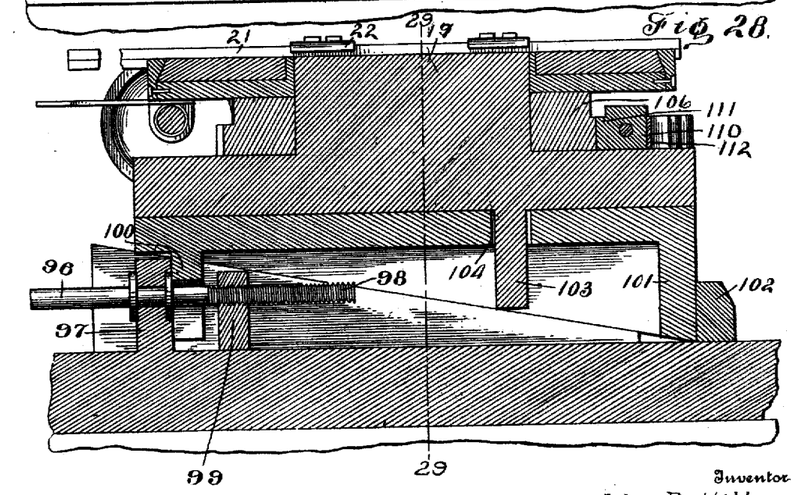
Fig. 28 is a longitudinal sectional view of the work-chuck, taken on the line 28 28 of Fig. 29.
Figure 29:
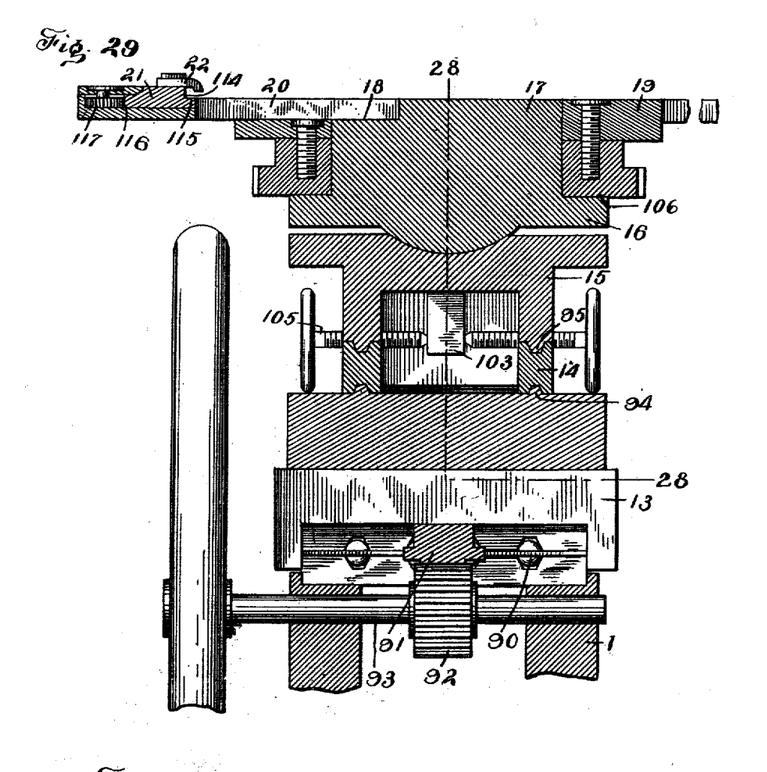
Fig. 29 is a transverse sectional view of the work-chuck, taken on the line 29 29 of Fig. 28.
Figure 30:
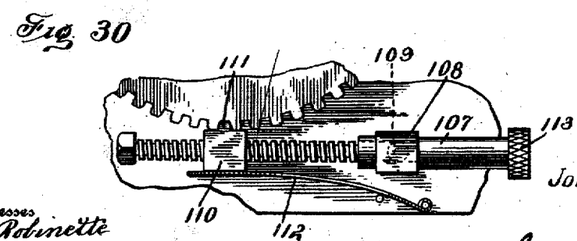
Fig. 30 is a detail plan view, on a larger scale, illustrating the adjustable pawl mechanism employed in the work-chuck.

The roll-supports 7 and 8 are provided with lugs 7ᵃ and 8ᵃ for supporting the spindle 33 of a transfer-roll in a manner similar to that described in my Patent No. 778,826. The support 7 is shown provided with a stud 34, having a notch or recess 35, constructed to receive and closely fit the lip 36 of a latch 37, pivoted at 37ᵃ to a roll-shifting arm 38, a locking-spring 40 being provided for retaining the latch in its adjusted positions. As shown especially in Fig. 16, the engaging walls of said latch and recess are preferably tapered to assure accurate positioning therebetween and to prevent looseness of the parts through wear.

A support 41 is shown rigidly secured to one of the stanchions 2 and provided on its upper face with an undercut channel 42, constructed to receive a dovetail projection 43 on the lower surface of a base member 44 of a proportional-spacing means for slidably supporting the latter. An angular bracket 45, carried by the press-bed 13, is rigidly secured to the base member 44 for reciprocating the latter on its support 41 upon actuation of the press-bed. A pattern-carrying member 46 has secured thereto an arc-shaped guide 47, constructed to fit in an annular undercut channel 48 in the base member. The guide 47 is provided with an aperture 49, adapted to be brought into registry with a series of apertures 50 in the base member to provide means whereby said pattern-carrying member can be locked in any desired angular position relative to the base member by a locking-pin extending through the registered apertures. A slide member 51 is provided with a dovetail projection 52, constructed to slidably engage a similar channel 53 in the upper surface of the base member, and with an undercut groove 54 in its upper surface adapted to receive a slide-block 55, which latter is pivotally supported on a slide-bar 56 on the pattern-carrying member.

A screw 57, swiveled at 58 on the pattern-carrying member, is provided with a vernier-wheel 59, placed in coöperative relation to a pointer 60 on the pattern-carrying member. The two portions 61 of a split nut are slidably mounted in the guides 62 on the lower surface of the pattern-carrying member and provided with pins 63, which extend within eccentric slots 64 in a disk 65, rotatably supported on the pattern-carrying member by a spindle 66. The spindle 66 carries a handle 67 for actuating it to shift the portions 61 of the split nut into and out of mesh with the screw 57, a thumb-nut 68, threaded on the spindle, providing means for locking the parts.

The roll-shifting arm 38 is secured to the slide member 51 and provided with an index-mark 69, arranged to be shifted into registry with an index 70, carried by the guide 6 of the roll-support. A block 79, carried by the arm 38, is arranged to slide in a groove or recess 80 in a guiding and supporting bar 81, secured to the bracket 41. The block 79 is provided with guides 74 for an adjustable split nut 75, a slotted disk 77 and spindle 78 being provided for actuating the nut in a manner similar to that described with reference to the split nut 61.

Figures 1, 24, 25, 26:
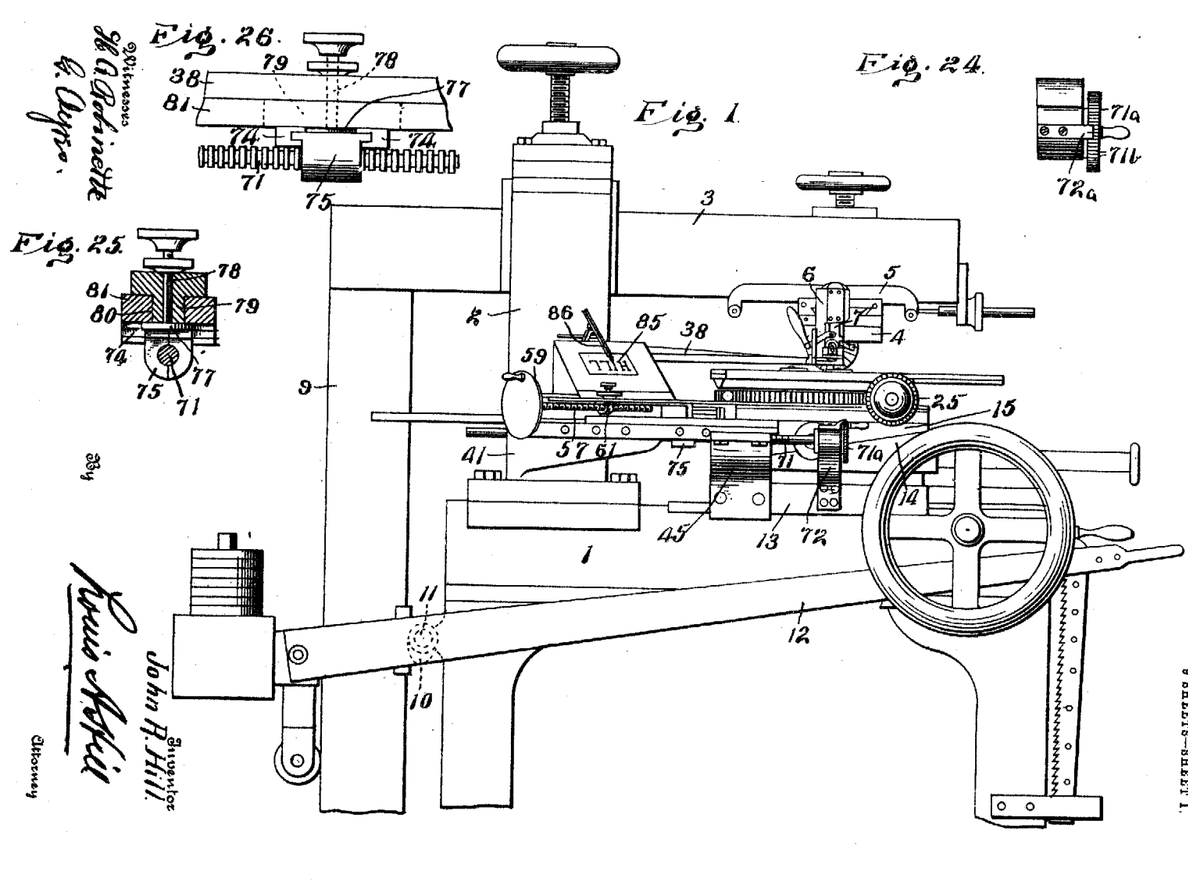
Figure 1 is a side elevation illustrating my invention applied to a transfer-press.
Fig. 24 is a detail plan view, on a larger scale, showing the arrangement of the vernier-wheel and index-mark employed with the screw 71.
Fig. 25 is a detail sectional view, on a larger scale, on the line 25 25 of Fig. 12.
Fig. 26 is a side elevation of the parts shown in Fig. 25.
Figures 2, 18, 19:
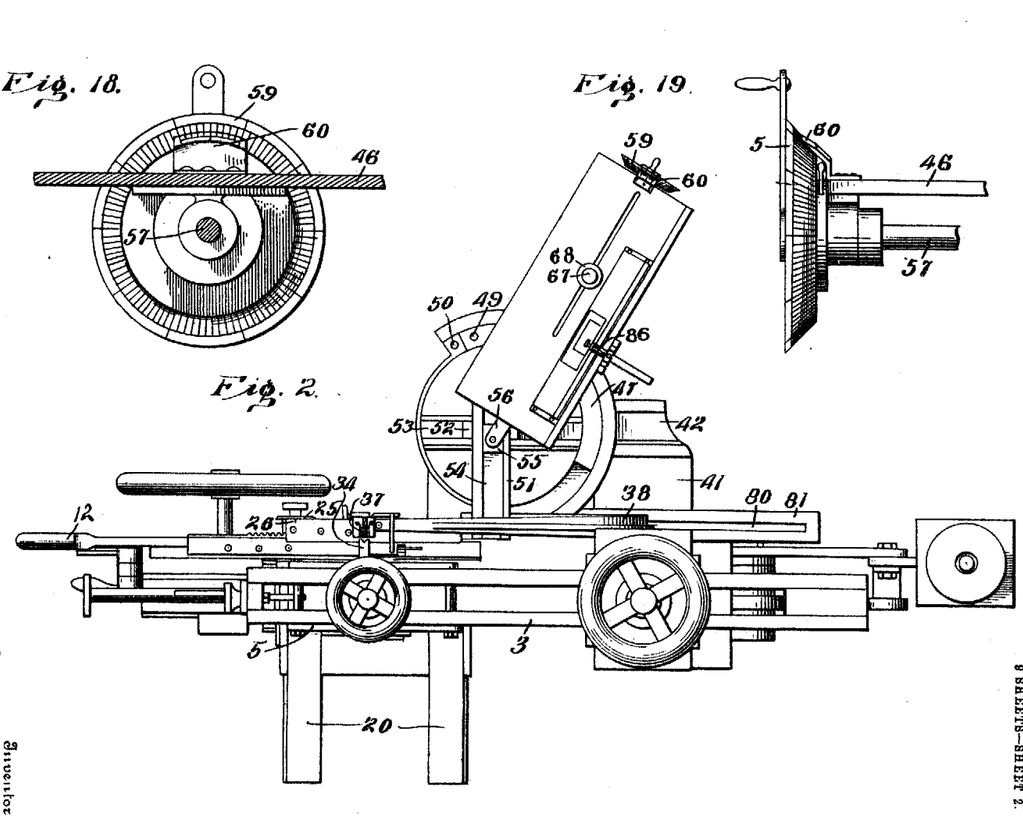
Fig. 2 is a plan view of the construction shown in Fig. 1.
Fig. 18 is a detail sectional view, on a larger scale, taken on the line 18 18 of Fig. 3.
Fig. 19 is a side elevation of the parts shown in Fig. 18.
Figures 3, 6:
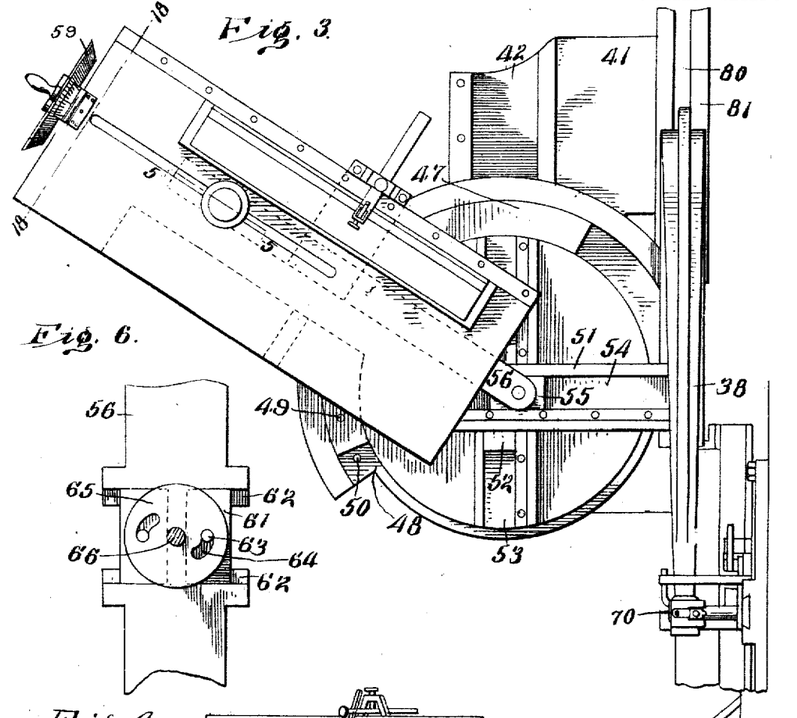
Fig. 3 is a plan view, on a larger scale, of the proportional-spacing means shown in Figs. 1 and 2.
Fig. 6 is a sectional view on the line 6 6 of Fig. 5.
Figures 4, 5:
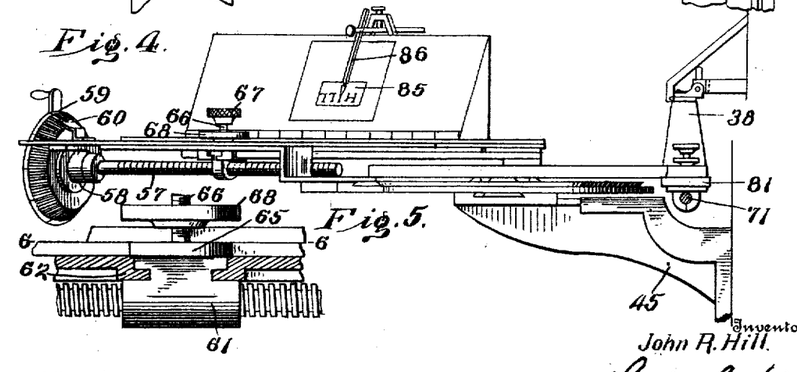
Fig. 4 is a front elevation of the construction shown in Fig. 3.
Fig. 5 is a detail sectional elevation, on a larger scale, taken on the line 5 5 of Fig. 3.
Figures 7, 8, 9, 10, 11, 12:
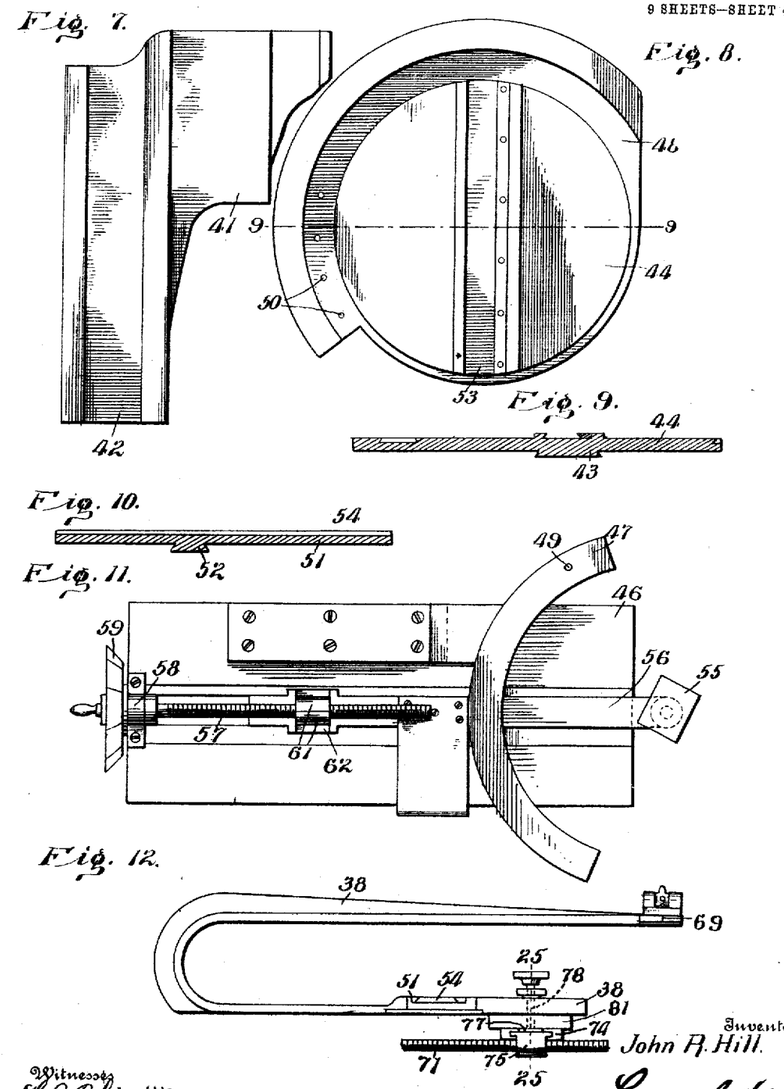
Fig. 7 is a detail plan view of the stationary supporting-bracket for the adjustable proportional-spacing mechanism.
Fig. 8 is a detail plan view of a disk-carrying member of the adjustable proportional-spacing mechanism.
Fig. 9 is a section on the line 9 9 of Fig. 8.
Fig. 10 is a longitudinal section of a slide member of the spacing mechanism.
Fig. 11 is a bottom plan view of the pattern-carrying angularly-adjustable member of the proportional-spacing mechanism, together with its attached parts.
Fig. 12 is a detail side elevation of the roll-shifting and pointer arm of the adjustable spacing mechanism.

A screw 71, arranged to be engaged by the split nut 75, is swiveled in a bracket 72, secured to the press-bed 13, and has its free end supported in a bore in the stationary bracket 41, the bracket 45 being shaped to permit the free travel of the nut 75 along its screw 71, as clearly shown in Fig. 4. A vernier-wheel 71ª, secured to said screw, is provided with a series of peripheral index-marks 71ᵇ, arranged in coöperative relation to a pointer 72ª, carried by the bracket 72. (See especially Figs. 1 and 24.)

Figure 13:
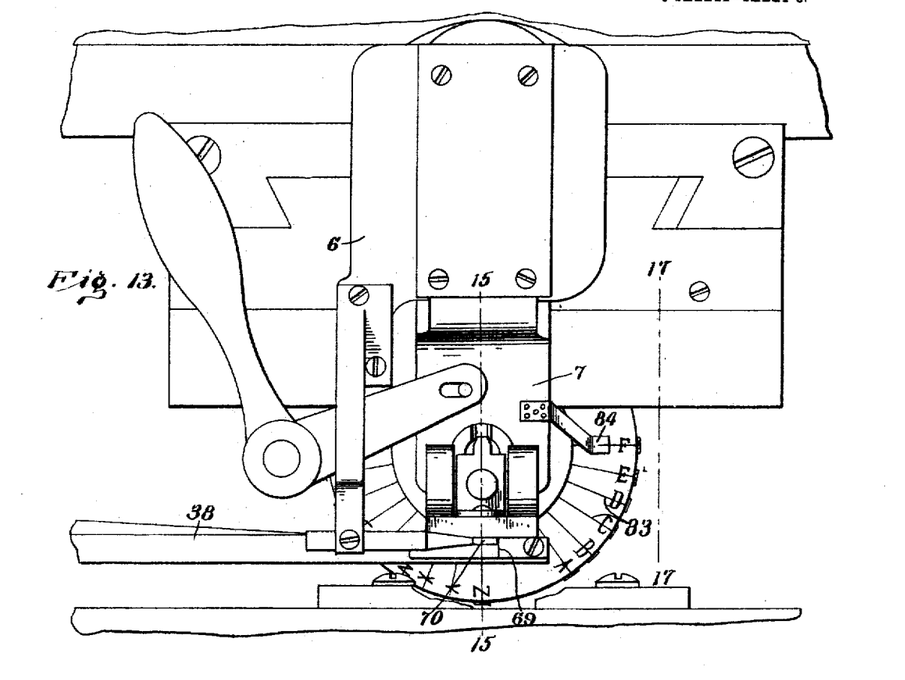
Fig. 13 is a detail end elevation, on a larger scale, of the transfer-roll and its coöperating parts.
Figure 14:
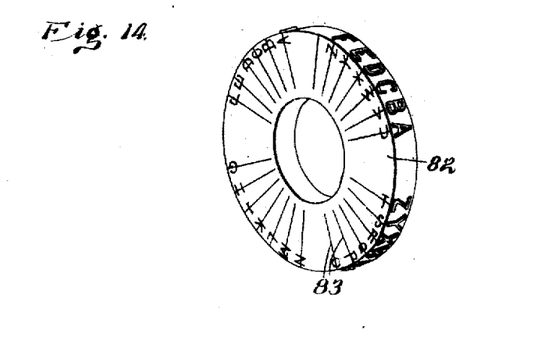
Fig. 14 is a detail perspective view of a roll-disk provided with one form of alphabet.

Referring especially to Figs. 13 and 14, the transfer-roll comprises a disk 82, provided on its periphery with an alphabet or other desired series of characters or designs. The roll-disk is provided on its side face with an index-mark 83 for each of its peripheral characters. Each index-mark is arranged angularly about the disk from the corresponding peripheral character and is provided with a similar reference character for properly designating it. I have illustrated the several index-marks arranged at ninety degrees from their respective peripheral characters in order that any desired index-mark may be brought into registry with a pointer 84 on the roll-support for properly adjusting the roll to bring the corresponding peripheral character into operative relation with a printing-plate. This angular arrangement of the peripheral characters and their index - marks permits the pointer 84 to be located at a considerable distance above the printing-plate, thereby anabling the reading of said index-marks and pointer to be made much more conveniently and accurately than in existing constructions of transfer-rolls.

From the above description it will be understood that my invention provides an improved means whereby any desired spacing and arrangement of the several characters transferred to a printing-plate can be obtained by the employment of either a guide-pattern or of tabulated or otherwise conveniently-arranged data indicating the required spacing between said several characters. When a guide-pattern is employed, the nut 61 is shifted into engagement with its screw 57 and the nut 75 is disengaged from its screw 71. The operation is then similar to that described in my above-referred-to Patent No. 778,826, and is as follows: A printing-plate for receiving the name or title is clamped to the member 21 of the work-chuck, and a stock transfer-roll carrying the proper characters for the desired style and design of name or title is positioned in the supports 7 and 8. A pattern 85, indicating the required characters in their desired arrangement, is then prepared of convenient size and secured in any suitable manner upon the pattern-carrying member 46 of the adjustable proportional-spacing mechanism and the pattern-carying member properly adjusted in the annular slot 48 to produce in subsequent operation the desired relative proportion between the spacing of the characters on the printing-plate and such spacing in the pattern. An index-finger 86, carried by the slide-bar 56, is then adjusted to the first character position on the pattern and the roll-saddle 5 shifted to bring the index 70 into registry with the index-mark 69. The work-chuck is then operated to bring the desired point of the printing-plate in position to receive the impression of the first character in the name or title and the transfer-roll rotated in its bearings to bring the index-mark of the desired first character into registry with the pointer 84. The lever 12 is then depressed and the character impressed in the plate in the usual manner. The screw 57 is then actuated to shift the slide-bar 56 sufficiently to bring the index 86 to the second character position of the pattern. Such shifting of the slide-bar 56 will act, through the block 55, to shift the slide member 51 and its attached arm 38 through a distance determined by the angular position in which the pattern-carrying member has been adjusted on the base member 44. This movement of the arm 38 will shift the index-mark 69 thereon from registry with the index 70 the exact distance desired for the spacing between the first and second characters on the printing-plate. The operator then shifts the press-bed 13, together with the angular bracket 45, secured thereto, until the base member 44, carried by said bracket, is moved sufficiently to bring the index-mark 69 again into registry with the index 70. The transfer-roll is then rotated in its supports sufficiently to establish registry between the pointer 84 and the index-mark 83 corresponding to the desired second character of the name or title. Such second character is then impressed in the printing-plate in the usual manner and the above steps repeated until the desired name or title has been completed.

My invention is capable of operation in either of two independent manners for accurately arranging and spacing the several characters on the printing-plate from tabulated or conveniently-arranged data. One of these operations is suitable where the spacing of the characters of the printing-plate corresponds to that of the guiding data, and the other operation is adapted to produce any desired proportion between the spacing of the characters on the printing-plate and the spacing indicated in the guiding data. In the first of these operations the nut 61 is released from its screw 57, and the nut 75 is thrown into engagement with its screw 71. The screw 71 is then actuated to properly position the arm 38 for engagement of its latch 37 with the recess 35 in the roll-support 7, and the latch is thrown into engagement with said recess for accurately arranging the initial position of the transfer-roll. The work-chuck is then operated to bring the desired point of the printing-plate in position to receive the impression of the first character in the name or title and the transfer-roll rotated in its bearings to bring the index-mark of the desired first character into registry with the pointer 84. The latch 37 is released from the recess 35 to permit free relative movement between the press-bed and roll-supports while the first character is rolled in the printing-plate in the usual manner, and the lever 12 is then depressed and the first character impressed in the printing-plate. The character can be conveniently rolled in the printing-plate by depressing the lever 12 until said character is impressed in the plate with the desired pressure and then slightly reciprocating the printing-plate by oscillating its shaft 93. The latch 37 is then thrown into engagement with the notch 35 for locking the roll-supports to the arm 38, and the screw 71 is turned through the particular number of divisions on its vernier-wheel 71$^a$ indicated in the guiding data as the required spacing between the first and second characters. The transfer-roll is then rotated in its supports sufficiently to establish registry between the pointer 84 and the index-mark 83, corresponding to the desired second character of the name or title. The latch 37 is then released from the recess 35 and the second character impressed in the printing-plate. The above steps are successively repeated until the name or title is completed. In the second of the specified manners of operation from guiding data the nut 75 is released from its screw 71 and the nut 61 is thrown in mesh with its screw 57. The member 46 of the proportional-spacing mechanism, which carries the screw 57, is then locked in proper angular adjustment on the base member 44 to give the desired proportion between the spacing of the characters on the printing-plate and the spacing indicated in the guiding data. With the parts arranged in this relative position, the steps just described are carried out, with the single exception that the roll-shifting arm 38 is adjusted by the screw 57 instead of by the screw 71.

I have illustrated herein my preferred embodiment; but obviously many changes could be made within the spirit and scope of my invention.

Having thus described my invention, what I claim as new, and desire to secure by Letters Patent, is—

1. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, and means constructed to actuate said adjusting means, substantially as described.

2. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, means constructed to actuate said adjusting means, and a vernier mechanism arranged to accurately indicate the extent of movement of said actuating means, substantially as described.

3. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, two actuating means for said adjusting means, and means constructed to independently connect either of said actuating means to said adjusting means, substantially as described.

4. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, two actuating means for said adjusting means, means constructed to independently connect either of said actuating means to said adjusting means, and vernier mechanisms arranged to accurately indicate the extent of movement of said two actuating means, substantially as described.

5. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, actuating means for said adjusting means, a proportional-spacing mechanism, a second actuating means carried by said proportional-spacing mechanism, and means constructed to independently connect either of said actuating means to said adjusting means, substantially as described.

6. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, actuating means for said adjusting means, a proportional-spacing mechanism, a second actuating means carried by said proportional-spacing mechanism, means constructed to independently connect either of said actuating means to said adjusting means, and vernier mechanisms arranged to accurately indicate the extent of movement of said two actuating means, substantially as described.

7. In an apparatus of the character described, the combination of an adjustably-mounted primary surface provided with a plurality of characters, a support for a secondary surface to receive impressions of the desired characters in their required relative arrangement, means constructed to produce universal adjustment of said support relative to said primary surface, adjusting means detachably connected to said primary surface for adjusting the latter, and means constructed to actuate said adjusting means, substantially as described.

8. In an apparatus of the character described, the combination of an adjustably-mounted primary surface provided with a plurality of characters, a support for a secondary surface to receive impressions of the desired character in their required relative arrangement, means constructed to produce universal adjustment of said support relative to said primary surface, adjusting means detachably connected to said primary surface for adjusting the latter, two actuating means for said adjusting means, and means constructed to independently connect either of said actuating means to said adjusting means, substantially as described.

9. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, means constructed to actuate said adjusting means, and means constructed to impress the desired characters in the secondary surface in their required relative arrangement, substantially as described.

10. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, two actuating means for said adjusting means, means constructed to independently connect either of said actuating means to said adjusting means, and means constructed to impress the desired characters in the secondary surface in their required relative arrangement, substantially as described.

11. In an apparatus of the character described, the combination of an adjustably-mounted primary surface provided with a plurality of characters, a support for a secondary surface to receive impressions of the desired characters in their required relative arrangement, adjusting means detachably connected to said primary surface for adjusting the latter, actuating means for said adjusting means, an adjustable proportional-spacing mechanism, means constructed to lock said adjustable spacing mechanism in its adjusted positions, a second actuating means carried by said proportional-spacing mechanism, and means constructed to independently connect either of said actuating means to said adjusting means, substantially as described.

12. In a transfer-press, the combination of a transfer-roll provided with a plurality of characters, a support for a secondary surface to receive impressions of the desired characters in their required relative arrangement, adjusting means detachably connected to said transfer-roll for adjusting the latter, and means constructed to actuate said adjusting means, substantially as described.

13. In a transfer-press, the combination of a transfer-roll provided with a plurality of characters, a support for a secondary surface to receive impressions of the desired characters in their required relative arrangement, adjusting means detachably connected to said transfer-roll for adjusting the latter, two actuating means for said adjusting means, and means constructed to independently connect either of said actuating means to said adjusting means, substantially as described.

14. In a transfer-press, the combination of an adjustable support, a transfer-roll mounted in said support and provided with a plurality of characters and corresponding index-marks, said index-marks positioned about said roll angularly to the respective corresponding character, a pointer carried by said roll-support in coöperative relation to said index-marks, and a support for a secondary surface to receive impressions of the desired characters in their required relative arrangement, substantially as described.

15. In a transfer-press, the combination of an adjustable support, a transfer-roll mounted in said support and provided with a plurality of characters and corresponding index-marks, said index-marks positioned about said roll angularly to the respective corresponding character, a pointer carried by said roll-support in coöperative relation to said index-marks, a support for a secondary surface to receive impressions of the desired characters in their required relative arrangement, adjusting means detachably connected to said transfer-roll for adjusting the latter, and means constructed to actuate said adjusting means, substantially as described.

16. In an apparatus of the character described, the combination of an adjustable support, a primary surface carried thereby provided with a plurality of characters, a support for a secondary surface to receive impressions of the desired characters, a proportional-spacing mechanism, an adjusting means carried by said proportional-spacing mechanism and arranged to detachably engage said primary-surface support, actuating means carried by said proportional-spacing mechanism for actuating said adjusting means, a second actuating means for said adjusting means, and means constructed to independently connect either of said actuating means to said adjusting means, substantially as described.

17. In an apparatus of the character described, the combination of an adjustable support, a pointer carried by said support, a transfer-roll mounted in said support and provided with a plurality of characters and corresponding index-marks, said index-marks positioned about said roll angularly to the respective corresponding characters, substantially as described.

In testimony whereof I affix my signature in presence of two witnesses.

JOHN R. HILL.

Witnesses
  W. W. CURRY,
  J. B. GOOD.